US011502373B2

(12) United States Patent
Kim et al.

(10) Patent No.: US 11,502,373 B2
(45) Date of Patent: *Nov. 15, 2022

(54) SEPARATOR, METHOD OF PREPARING THE SAME, AND LITHIUM BATTERY INCLUDING THE SAME

(71) Applicant: Samsung SDI Co., Ltd., Yongin-si (KR)

(72) Inventors: Gain Kim, Yongin-si (KR); Yongkyoung Kim, Yongin-si (KR); Jungyoon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 71 days.

This patent is subject to a terminal disclaimer.

(21) Appl. No.: 16/293,500

(22) Filed: Mar. 5, 2019

(65) Prior Publication Data
US 2019/0280274 A1    Sep. 12, 2019

(30) Foreign Application Priority Data
Mar. 6, 2018    (KR) .................. 10-2018-0026533

(51) Int. Cl.
*H01M 50/44*    (2021.01)
*H01M 10/052*    (2010.01)
(Continued)

(52) U.S. Cl.
CPC ......... *H01M 50/44* (2021.01); *H01M 10/052* (2013.01); *H01M 50/403* (2021.01);
(Continued)

(58) Field of Classification Search
CPC ............. H01M 2/1626; H01M 2/1686; H01M 2/1653; H01M 2/166; H01M 2/145;
(Continued)

(56) References Cited

U.S. PATENT DOCUMENTS 6,130,008 A * 10/2000 Yuasa .................. H01M 10/44
429/250
7,691,528 B2    4/2010 Hennige et al.
(Continued)

FOREIGN PATENT DOCUMENTS

CN    103155216 A    6/2013
CN    105440770 A    3/2016
(Continued)

OTHER PUBLICATIONS

Machine translation of KR-20160118979-A, Lee Joo Sung. (Year: 2016).*
(Continued)

*Primary Examiner* — Mayla Gonzalez Ramos
(74) *Attorney, Agent, or Firm* — Lewis Roca Rothgerber Christie LLP

(57) ABSTRACT

A separator includes a substrate and a coating layer on at least one surface of the substrate, wherein the coating layer includes first organic particles and second organic particles, and an average particle diameter of the first organic particles is larger than an average particle diameter of the second organic particles. The first organic particles protrude or extend to a height of about 0.1 µm to about 0.5 µm from a dented portion of a surface of the coating layer, and are distributed on the surface of the coating layer in an area ratio of about 5% or greater to less than 30% with respect to a total surface area of the coating layer. The separator may have improved adhesion to electrodes, insulation characteristics, and air permeability, and a battery including the separator may have improved lifespan characteristics.

19 Claims, 4 Drawing Sheets

(51) Int. Cl.
*H01M 50/429* (2021.01)
*H01M 50/403* (2021.01)
*H01M 50/411* (2021.01)
*H01M 50/449* (2021.01)
*H01M 50/446* (2021.01)

(52) U.S. Cl.
CPC ..... *H01M 50/411* (2021.01); *H01M 50/4295* (2021.01); *H01M 50/446* (2021.01); *H01M 50/449* (2021.01)

(58) Field of Classification Search
CPC .......... H01M 10/052; H01M 10/4235; H01M 50/40; H01M 50/403; H01M 50/44; H01M 50/411; H01M 50/446; H01M 50/46; H01M 50/461; H01M 10/0525; H01M 50/4295; H01M 50/449; Y02E 60/10
See application file for complete search history.

(56) References Cited

U.S. PATENT DOCUMENTS

| | | | |
|---|---|---|---|
| 9,178,198 | B2 | 11/2015 | Yeou et al. |
| 9,287,544 | B2 | 3/2016 | Matsumoto et al. |
| 9,825,271 | B2 | 11/2017 | Yoon et al. |
| 10,084,178 | B2 * | 9/2018 | Ho ................. H01M 4/131 |
| 10,217,983 | B2 | 2/2019 | Kim et al. |
| 10,243,189 | B2 | 3/2019 | Okuno et al. |
| 10,497,914 | B2 | 12/2019 | Pan et al. |
| 10,541,401 | B2 * | 1/2020 | Lee ................. H01M 2/1686 |
| 10,586,969 | B2 | 3/2020 | Sung et al. |
| 2010/0055554 | A1 | 3/2010 | Makidera et al. |
| 2010/0167124 | A1 | 7/2010 | Seo et al. |
| 2013/0266873 | A1 * | 10/2013 | Ishii ................. H01M 50/403 429/246 |
| 2014/0045031 | A1 | 2/2014 | Matsumoto et al. |
| 2014/0147726 | A1 | 5/2014 | Toyoda |
| 2014/0242443 | A1 * | 8/2014 | Hirai ................. H01M 10/0525 429/144 |
| 2015/0004464 | A1 * | 1/2015 | Okuno ................. H01M 2/1686 429/143 |
| 2015/0056491 | A1 * | 2/2015 | Zhao ................. H01M 2/145 429/144 |
| 2015/0093625 | A1 * | 4/2015 | Hirano ................. H01M 2/1626 429/144 |
| 2015/0140404 | A1 * | 5/2015 | Yoo ................. H01M 2/166 429/145 |
| 2016/0013465 | A1 | 1/2016 | Akiike |
| 2016/0072111 | A1 | 3/2016 | Kim et al. |
| 2016/0126519 | A1 | 5/2016 | Kim et al. |
| 2016/0141576 | A1 | 5/2016 | Lee et al. |
| 2016/0141579 | A1 | 5/2016 | Seok et al. |
| 2016/0164065 | A1 | 6/2016 | Liu et al. |
| 2016/0197327 | A1 | 7/2016 | Li et al. |
| 2016/0218340 | A1 * | 7/2016 | Ryu ................. H01M 2/145 |
| 2016/0254511 | A1 | 9/2016 | Hatta et al. |
| 2017/0025658 | A1 | 1/2017 | Shi et al. |
| 2017/0069893 | A1 * | 3/2017 | Ahn ................. H01M 2/166 |
| 2017/0162848 | A1 | 6/2017 | Pan et al. |
| 2018/0053963 | A1 * | 2/2018 | Tanaka ................. H01M 50/411 |
| 2018/0277815 | A1 | 9/2018 | Sung et al. |
| 2019/0207189 | A1 * | 7/2019 | Arai ................. H01M 10/4235 |
| 2020/0020897 | A1 * | 1/2020 | Enomoto ............. H01M 2/1229 |
| 2020/0334759 | A1 | 10/2020 | Lutnick et al. |
| 2020/0335759 | A1 | 10/2020 | Lane et al. |
| 2021/0005858 | A1 | 1/2021 | Kim et al. |

FOREIGN PATENT DOCUMENTS

| | | | |
|---|---|---|---|
| CN | 105609688 | A | 5/2016 |
| CN | 106505172 | A | 3/2017 |
| CN | 107431169 | A | 12/2017 |
| CN | 111954943 | A | 11/2020 |
| EP | 2669970 | A1 | 12/2013 |
| EP | 3024062 | A1 | 5/2016 |
| JP | 2006-66355 | A | 3/2006 |
| JP | 2009-199798 | A | 9/2009 |
| JP | 2012-155914 | A | 8/2012 |
| JP | 5225173 | B2 | 7/2013 |
| JP | 5292705 | B2 | 9/2013 |
| JP | 2015-41570 | A | 3/2015 |
| JP | 2015-41606 | A | 3/2015 |
| JP | 2015-88478 | A | 5/2015 |
| JP | 2015-144082 | A | 8/2015 |
| JP | 2016-100334 | A | 5/2016 |
| JP | 2017-103031 | A | 6/2017 |
| KR | 10-2007-0082578 | A | 8/2007 |
| KR | 10-0979084 | B1 | 8/2010 |
| KR | 10-2013-0099463 | A | 9/2013 |
| KR | 10-2014-0135956 | A | 11/2014 |
| KR | 10-2015-0013088 | A | 2/2015 |
| KR | 10-2015-0051916 | A | 5/2015 |
| KR | 10-2016-0032965 | A | 3/2016 |
| KR | 10-2016-0041492 | A | 4/2016 |
| KR | 10-1616079 | B1 | 4/2016 |
| KR | 10-2016-0117109 | A | 10/2016 |
| KR | 10-2016-0118979 | A | 10/2016 |
| KR | 20160118979 | A * | 10/2016 |
| KR | 10-2016-0128726 | A | 11/2016 |
| KR | 10-2016-0133275 | A | 11/2016 |
| KR | 10-2017-0007210 | A | 1/2017 |
| KR | 20170112250 | A * | 10/2017 |
| WO | WO 2013/005796 | A1 | 1/2013 |
| WO | 2013/125645 | A1 | 8/2013 |
| WO | WO 2014/148577 | A1 | 9/2014 |
| WO | 2016/152026 | A1 | 9/2016 |
| WO | 2017/010780 | A1 | 1/2017 |
| WO | WO 2017/015535 | A1 | 1/2017 |
| WO | 2017/033993 | A1 | 3/2017 |
| WO | 2018/017944 | A1 | 1/2018 |
| WO | WO 2018/004277 | A1 | 1/2018 |
| WO | WO 2018/037867 | A1 | 3/2018 |

OTHER PUBLICATIONS

Machine translation of KR-20170112250-A, Han Da Kyung. (Year: 2017).*
Extended European Search Report for corresponding European Patent Application No. 19160936.1, dated Apr. 24, 2019, 10 pages.
Database WPI, Week 201805, Thomson Scientific, London, GB; AN 2018-01168R, XP002790440, 2017 Clarivate Analytics, 3 pages.
Fedelich, Nicolas, "Application Handbook: Thermal Analysis of Polymers: Selected Applications," Thermal Analysis, Jan. 2013, XP055608279, 40 pages, Retrieved from the Internet: URL:https://www.mt.com/dam/LabDiv/guides-glen/ta-polymer/TA_Polymers_Selected_Apps_EN.pdf.
Japanese Office action dated Feb. 10, 2020, for corresponding Japanese Patent Application No. 2019-039716, 5 pages.
EPO Office Action dated May 6, 2020, for corresponding European Patent Application No. 19160936.1, 6 pages.
Chinese Office Action, with English translation, dated Aug. 2, 2021, issued in corresponding Chinese Patent Application No. 201910167027.2 (23 pages).
Japanese Office Action dated Aug. 10, 2021, issued in corresponding Japanese Patent Application No. 2019-039716 (5 pages).
Korean Office Action dated May 11, 2020 issued in Korean patent application No. 10-2018-0023100 (121 pages).
Korean Notice of Allowance dated Nov. 19, 2020 issued in Korean patent application No. 10-2018-0023100 (6 pages).
International Search Report received in PCT/KR2019/000650, dated Apr. 18, 2019, 2 pages.
Japanese Office Action dated Nov. 9, 2020, issued in Japanese Patent Application No. 2019-039716 (3 pages).
Japanese Office Action, for Patent Application No. JP 2019-039716, dated Dec. 24, 2021, 3 pages.
Chinese Notification of the Second Office Action, for Patent Application No. 201910167027.2, dated Apr. 7, 2022, 7 pages.

(56) References Cited

OTHER PUBLICATIONS

English translation of the Chinese Notification of the Second Office Action, for Patent Application No. 201910167027.2, dated Apr. 7, 2022, 7 pages.
Chinese Office Action for CN Application No. 201980025133.5 dated Apr. 29, 2022, 9 pages.
English Translation of Chinese Office Action for CN Application No. 201980025133.5 dated Apr. 29, 2022, 10 pages.
European Search Report for EP Application No. 19757163.1 dated Oct. 29, 2021, 9 pages.
Chinese Notice Of Allowance, with English translation, dated Jul. 6, 2022, issued in corresponding Chinese Patent Application No. 201910167027.2 (6 pages).

* cited by examiner

SEPARATOR, METHOD OF PREPARING THE SAME, AND LITHIUM BATTERY INCLUDING THE SAME

CROSS-REFERENCE TO RELATED APPLICATION

This application claims priority to and the benefit of Korean Patent Application No. 10-2018-0026533, filed on Mar. 6, 2018, in the Korean Intellectual Property Office, the entire content of which is incorporated herein by reference.

BACKGROUND

1. Field

One or more aspects of example embodiments of the present disclosure are related to a separator, a method of preparing the separator, and a lithium battery including the separator.

2. Description of the Related Art

In accordance with trends towards small-sized, high-performance devices, smaller, more lightweight lithium batteries are desired. Meanwhile, the discharge capacity, energy density, and cycle characteristics of lithium batteries are becoming more important for electric vehicle applications. To satisfy these demands, there is a need for lithium batteries having high discharge capacity per unit volume, high energy density, and good lifespan characteristics.

A separator may be positioned between a positive electrode and a negative electrode to prevent or reduce the risk of short circuit in a lithium battery. An electrode assembly, which includes the positive electrode, the negative electrode, and the separator between the positive electrode and the negative electrode, may be wound in the form of a jelly roll and then roll-pressed to improve adhesion between the separator and the electrodes in the electrode assembly.

Olefin polymers are widely used in separators for lithium batteries. Olefin polymers have good flexibility, but tend to be limited by insufficient impregnation of liquid electrolyte due to their hydrophobic characteristics, and are prone to battery short circuit due to thermal shrinkage at high temperatures of 100° C. or greater.

To solve these problems, a separator manufactured by coating a ceramic material on a surface of a porous olefin polymer substrate has been suggested to provide improved separator strength and heat resistance. However, such ceramic-coated separators may have poor adhesion to the positive and negative electrodes, and tend to be deformed due to volume change of the battery during charging and discharging.

To improve adhesion between the ceramic-coated separator and the positive and negative electrodes, a separator further including a binder on the ceramic coating has been suggested. However, a separator including a binder on the ceramic coating may have increased internal resistance due to reduced porosity, as well as an increased thickness, leading to swelling of the binder in liquid electrolyte and a higher chance of lithium battery deterioration.

When a ceramic is used as a coating material, it is necessary or desirable to use microparticles to minimize or decrease the coating thickness. However, an increased moisture content due to an increase in the specific surface area of the microparticles may lead to a decrease in cell lifetime.

Therefore, a separator capable of overcoming the drawbacks of the related art, having improved adhesion to electrodes, a thin thickness, improved insulation properties, and improved permeability (such as air and electrolyte permeability) is desired.

SUMMARY

One or more aspects of example embodiments of the present disclosure are directed toward a separator having improved adhesion to electrodes, improved insulation properties, and improved permeability (such as air and electrolyte permeability).

One or more aspects of example embodiments of the present disclosure are directed toward a method of preparing the separator.

One or more aspects of example embodiments of the present disclosure are directed toward a lithium battery including the separator.

Additional aspects will be set forth in part in the description which follows and, in part, will be apparent from the description, or may be learned by practice of the presented embodiments.

According to one or more example embodiments of the present disclosure, a separator includes a substrate and a coating layer on at least one surface of the substrate, wherein the coating layer includes first organic particles and second organic particles. An average particle diameter of the first organic particles may be larger than an average particle diameter of the second organic particles, and the first organic particles may extend or protrude a height of about 0.1 µm to about 0.5 µm from a dented portion of a surface of the coating layer, and may be distributed on the surface of the coating layer in an area ratio of about 5% or greater to less than 30%, with respect to a total surface area of the coating layer.

According to one or more example embodiments of the present disclosure, a method of preparing the above-described separator includes: preparing a slurry including the first organic particles and the second organic particles; coating the slurry on the at least one surface of the substrate; and drying the coated resultant (e.g., drying the slurry to produce a coating layer).

According to one or more example embodiments of the present disclosure, a lithium battery includes: a positive electrode; a negative electrode; and the above-described separator interposed between the positive electrode and the negative electrode.

BRIEF DESCRIPTION OF THE DRAWINGS

These and/or other aspects will become apparent and more readily appreciated from the following description of example embodiments, taken in conjunction with the accompanying drawings, in which.

DETAILED DESCRIPTION

Figure 1:
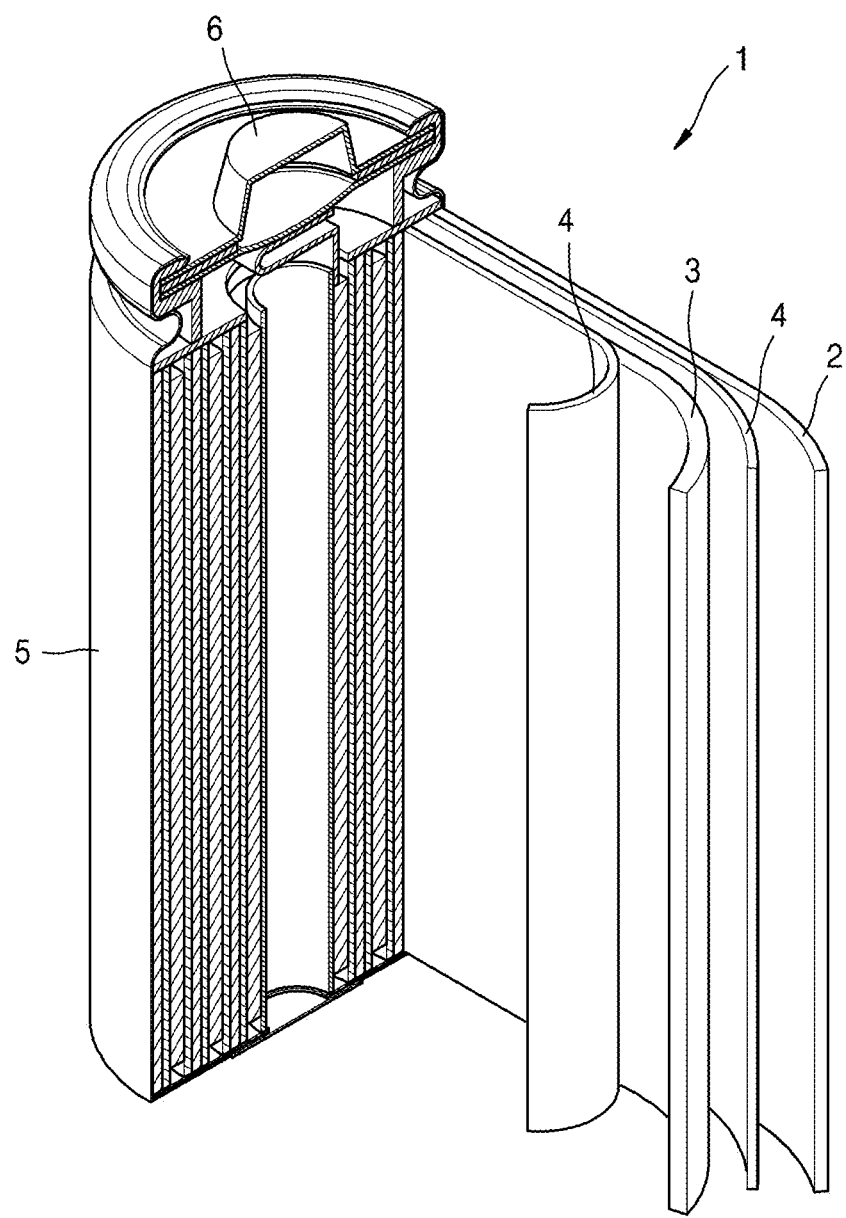
FIG. 1 is a schematic view of a lithium battery according to an embodiment of the present disclosure.

Reference will now be made in more detail to example embodiments, examples of which are illustrated in the accompanying drawings, wherein like reference numerals refer to like elements throughout and duplicative descriptions thereof may not be provided. In this regard, the present embodiments may have different forms and should not be construed as being limited to the descriptions set forth herein.

Accordingly, the embodiments are merely described below, by referring to the drawings, to explain aspects of the present description. As used herein, the term "and/or" includes any and all combinations of one or more of the associated listed items. Expressions such as "at least one of", "one of", and "selected from" when preceding a list of elements, modify the entire list of elements and do not modify the individual elements of the list. Further, the use of "may" when describing embodiments of the present disclosure refers to "one or more embodiments of the present disclosure."

The thicknesses of layers, films, panels, regions, etc., may be exaggerated in the drawings for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

Hereinafter, embodiments of a separator, a method of preparing the separator, and a lithium battery including the separator will be described in greater detail. These embodiments are provided only for illustrative purposes, and are not intended to limit the scope of the embodiments of the present disclosure.

Separator

According to one or more embodiments of the present disclosure, a separator includes a substrate and a coating layer on at least one surface of the substrate, wherein the coating layer includes first organic particles and second organic particles. An average particle diameter of the first organic particles may be larger than an average particle diameter of the second organic particles, and the first organic particles may extend or protrude a height of about 0.1 μm to about 0.5 μm from a dented portion of a surface of the coating layer, and may be distributed on a surface area of the coating layer corresponding to about 5% or greater to less than 30% of a total surface area of the coating layer.

The first organic particles used in the coating layer are made of an organic material, which supports adhesion of the separator to the electrode(s). The second organic particles used in the coating layer may act as a filler material in the coating layer. Due to the inclusion of the first organic particles, which may have adhesive properties (e.g., be adhesive), and the second organic particles, which may have filler properties (e.g., be filler particles), the separator according to one or more embodiments of the present disclosure may provide or enable increased adhesive strength between the separator and electrodes in the absence of (without) an adhesive layer, and may enable improved insulation characteristics and/or air permeability. Particle diameter (e.g., particle size) analysis in the claimed diameter range may be performed on a routine basis using any suitable method, such as dynamic light scattering (DLS), for example, as specified in ISO 22412:2017, the entire content of which is incorporated herein by reference. For particle diameter distributions, the median particle diameter may be referred to as D50. The D50 is the diameter in microns that splits the particle diameter distribution, with half of the distribution being above, and half of the distribution being below the D50 diameter.

In the separator according to one or more embodiments of the present disclosure, the substrate may be a porous substrate. The porous substrate may be a porous membrane including a polyolefin. Polyolefin may have a good short-circuit prevention or reduction effect, and may improve battery safety with a shutdown effect. In some embodiments, the porous substrate may be a membrane including (e.g., formed of) a resin, for example, a polyolefin such as polyethylene, polypropylene, polybutene, polyvinyl chloride, a mixture thereof, or a copolymer thereof. However, embodiments of the present disclosure are not limited thereto. The porous substrate may be any porous membrane available in the art. For example, the porous substrate may be a porous membrane formed of a polyolefin resin; a porous membrane woven from polyolefin fibers; a nonwoven fabric including polyolefin; or an aggregate of insulating material particles. The porous membrane including the polyolefin may be compatible with a binder solution having favorable coating properties to form the coating layer on the substrate, resulting in a decreased thickness of the separator, an increased proportion of active material in the battery, and an increased capacity per unit volume.

In some embodiments, the polyolefin used as a material in the porous substrate may be a homopolymer such as polyethylene or polypropylene, a copolymer thereof, or a mixture thereof (e.g., of two or more homopolymers). The polyethylene may be a low-density polyethylene, a medium-density polyethylene, or a high-density polyethylene. The high-density polyethylene may be used to provide increased mechanical strength. A mixture of at least two polyethylenes may be used to provide increased flexibility. The reagents and methods used to prepare the polyethylenes, including the polymerization catalyst, are not particularly limited. For example, the polymerization catalyst may be a Ziegler-Natta catalyst, a Phillips catalyst, or a metallocene catalyst. To ensure both mechanical strength and high permeability, the polyethylene may have a weight average molecular weight of about 100,000 to about 12,000,000, and in some embodiments, about 200,000 to about 3,000,000. The polypropylene may be a homopolymer, a random polymer, or a block copolymer, which may be used alone or in combination of at least two polymers. The polyethylene may have any stereoregularity and is not particularly limited as such. For example, the polyethylene may have isotactic, syndiotactic, or atactic form, or any combination thereof. Additional or other polyolefins, except for polyethylene and polypropylene, may be added as long as they do not affect the features of embodiments of the present disclosure, and in some embodiments, an anti-oxidant may be added to the polyolefin.

In some embodiments, the porous substrate may be a multilayer substrate including at least two layers formed of a polyolefin (such as polyethylene, polypropylene, and/or the like). In some embodiments, the porous substrate may include mixed multiple layers, and may be, for example, a 2-layer separator including polyethylene/polypropylene layers, a 3-layer separator including polyethylene/polypropylene/polyethylene layers, or a 3-layer separator including polypropylene/polyethylene/polypropylene layers. However, embodiments of the present disclosure are not limited thereto. Any suitable material and any suitable structure available for porous substrates in the related art may be used.

In some embodiments, for example, the porous substrate may include a diene polymer prepared by polymerizing a monomer composition including a diene monomer. The diene monomer may be a conjugated diene monomer or a non-conjugated diene monomer. For example, the diene monomer may include at least one selected from 1,3-butadiene, isoprene, 2-chloro-1,3-butadiene, 2,3-dimethyl-1,3-butadiene, 1,3-2-ethyl-1,3-butadiene, pentadiene, chloroprene, vinylpyridine, vinylnorbornene, dicyclopentadiene, and 1,4-hexadiene. However, embodiments of the present disclosure are not limited thereto. Any diene monomers available in the art may be used.

In the separator according to embodiments of the present disclosure, the porous substrate may have a thickness of about 1 μm to about 100 μm. For example, the porous substrate may have a thickness of about 1 μm to about 30 μm, about 5 μm to about 20 μm, about 5 μm to about 15 μm, or about 5 μm to about 10 μm. When the thickness of the porous substrate is less than 1 μm, it may be difficult to maintain the mechanical properties (e.g., mechanical and/or structural integrity) of the separator. When the porous substrate of the separator has a thickness greater than 100 μm, the lithium battery may exhibit increased internal resistance and lowered or limited battery capacity.

In the separator according to embodiments of the present disclosure, the porous substrate may have a porosity of about 5% to about 95%. When the porous substrate has a porosity of less than 5%, the lithium battery may exhibit increased internal resistance. When the porous substrate has a porosity greater than 95%, it may be difficult to maintain the mechanical properties (e.g., mechanical and/or structural integrity) of the porous substrate.

In the separator according to one or more embodiments of the present disclosure, the porous substrate may have a pore size of about 0.01 μm to about 10 μm. For example, the porous substrate of the separator may have a pore size of about 0.01 μm to about 5 μm, and in some embodiments, about 0.01 μm to about 1 μm. When the pore size of the porous substrate is less than 0.01 μm, the lithium battery may exhibit increased internal resistance. When the pore size of the porous substrate exceeds 10 μm, it may be difficult to maintain the mechanical properties (e.g., mechanical and/or structural integrity) of the porous substrate, and problems such as lithium precipitation and/or a voltage drop may occur.

Figure 2:
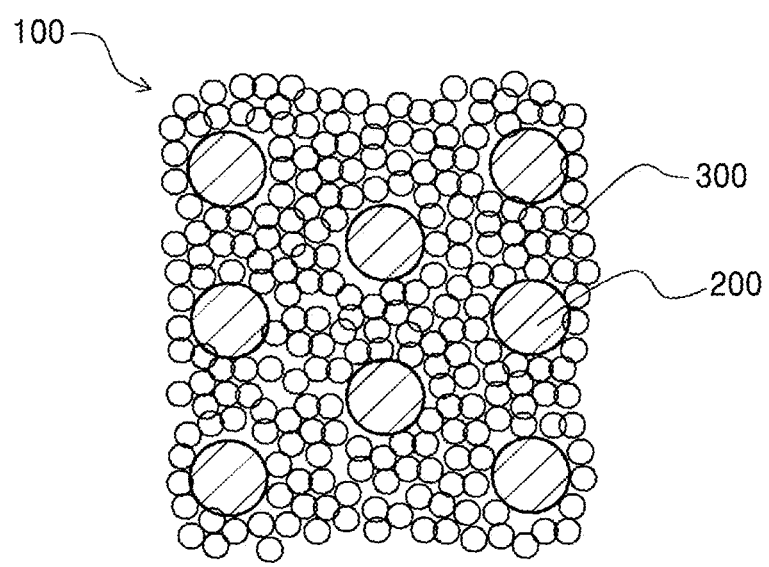
FIG. 2 is a schematic view of a coating layer of a separator according to an embodiment of the present disclosure.
Figure 3:
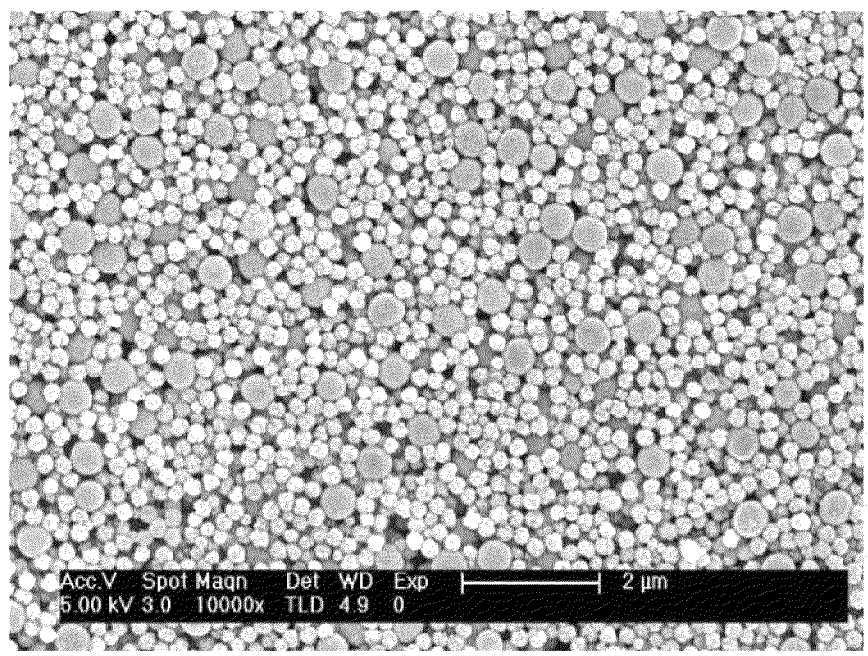
FIG. 3 is a scanning electron microscope (SEM) image of a surface of a separator according to an embodiment of the present disclosure.
Figure 4:
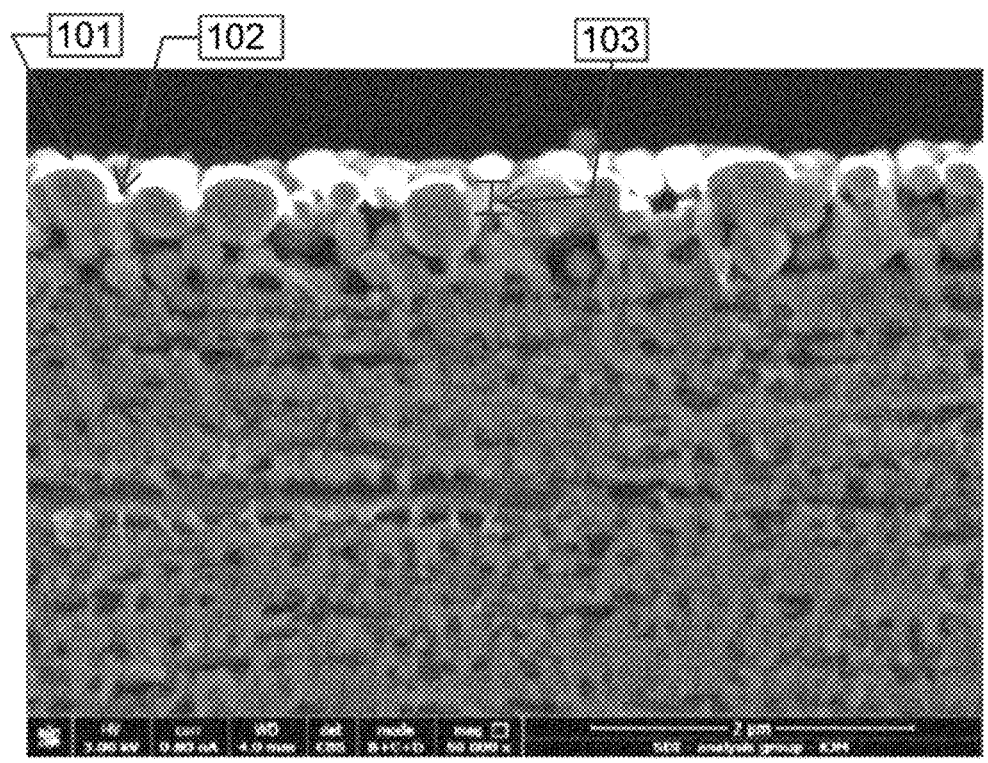
FIG. 4 is a SEM image of a cross-section of a separator according to an embodiment of the present disclosure.

The coating layer may include the first organic particles and the second organic particles. FIG. 2 is a schematic view of the coating layer of the separator according to embodiments of the present disclosure. FIGS. 3 and 4 are scanning electron microscope (SEM) images of the surface and a cross-section of the separator according to embodiments of the present disclosure, respectively.

Referring to FIGS. 2 to 4, the coating layer 100 of the separator according to embodiments of the present disclosure may include first organic particles 200 and second organic particles 300 mixed together. For example, the coating layer of the separator according to embodiments of the present disclosure may include the first organic particles and the second organic particles in mixed form in a single layer (e.g., as a mixture in the same layer), not independently as separate layers. The first organic particles may be adhesive particles that enhance the adhesive force between the separator and the electrode. The first organic particles may protrude at least to a set or predetermined height from a dented portion of a surface of the porous coating layer so that they are embossed (e.g., form an embossed structure).

The first organic particles may protrude as an embossed structure from the surface of the porous coating layer to thereby act as an electrode adhesive. To this end, an average particle diameter of the first organic particles may be larger than an average particle diameter of the second organic particles, and the first organic particles may protrude to a height of about 0.1 μm to about 0.5 μm from a dented portion of the surface of the coating layer. For example, the first organic particles may protrude to a height of about 0.1 μm to about 0.4 μm from a dented portion of the surface of the coating layer. In some embodiments, the first organic particles may protrude to a height of about 0.2 μm to about 0.3 μm from a dented portion of the surface of the coating layer. To this end, the first organic particles may have an average particle diameter about 1.1 times to about 5 times larger than that of the second organic particles. For example, as shown in FIG. 4, a surface of the coating layer has an uneven upper structure, e.g., embossed structure, including a protruded portion (101) including the first organic particles, and a dented portion (102) between the protruded first organic particles. For example, a height difference (103) between the top of the protruded portion (101) including the first organic particles and the bottom of the dented portion (102) between the protruded first organic particles may be about 0.1 μm to about 0.5 μm.

The first organic particles may have an average particle diameter of about 0.3 μm to about 0.7 μm. For example, the first organic particles may have an average particle diameter of about 0.3 μm to about 0.5 μm. For example, the first organic particles may have an average particle diameter of about 0.4 μm to about 0.5 μm. When the first organic particles have an average particle diameter smaller than 0.3 μm, the first organic particles may not protrude from the surrounding surface of the coating layer to enable adhesion to the electrode, or may not provide air (or electrolyte) permeability, thereby increasing battery resistance. When the first organic particles have an average particle diameter greater than 0.7 μm, the lithium battery may have increased resistance because the thickness of the separator is too thick.

An average separation distance between (between surfaces of) the first organic particles may be about 0.5 μm to about 5.0 μm, for example, about 0.5 μm to about 3.0 μm, or about 0.5 μm to about 1 μm. When the average separation distance between the first organic particles is less than 0.5 μm, the air permeability of the separator may be decreased, leading to increased battery resistance. When the average separation distance between the first organic particles exceeds 5 μm, the first organic particles may not enable adhesion to the electrode.

The first organic particles used in the coating layer may be any adhesive organic particles available in the art. In this regard, the first organic particles may have a glass transition temperature ($T_g$) lower than the maximum temperature at which lamination of electrode assemblies is performed. For example, the first organic particles may have a glass transition temperature ($T_g$) of about 40° C. to about 70° C. When the glass transition temperature of the first organic particles is above this range, side reactions of electrolyte may occur when the press temperature is increased to sufficiently enhance the adhesion between the first organic particles and the electrodes. On the other hand, when the glass transition temperature of the first organic particles is too low, the first organic particles may form a film during post-coating heated drying, resulting in an increase in battery resistance.

The first organic particles may have an appropriate or suitable degree of swelling in an electrolyte solution for use in a lithium battery. For example, the first organic particles may be spherical particles having a degree of swelling of about 200% to about 1,000% when left in an electrolyte solution at a temperature of about 50° C. to about 70° C. for about 70 hours to about 80 hours. When the degree of swelling is less than 200%, a reduced adhesion area between the separator and the electrode may be formed, and the cell thickness may be increased during the lifetime of the battery. On the other hand, when the degree of swelling exceeds 1,000%, the first organic particles may block the pores of the separator together with the second organic particles and thus increase the battery resistance. In addition, the first organic particles should be insoluble (e.g., should have a degree of swelling of less than about 1,000%) in the solvent (or in the dispersion solution in the preparation of a slurry), and should be maintained in particle form after coating of the slurry in order to inhibit reduction in air permeability of the separator.

In some embodiments, the first organic particles may be at least one of polystyrene (PS), polyvinylidene fluoride (PVdF), polymethyl methacrylate (PMMA), polyacrylonitrile (PAN), polyvinylidene, polyvinyl acetate (PVA), polyethylene oxide (PEO), cellulose acetate, and azodicarbonamide. However, embodiments of the present disclosure are not limited thereto.

The first organic particles may be single (primary) particles, or secondary particles formed as aggregates of single (primary) particles.

The first organic particles may be distributed on a surface of the coating layer in an area ratio of about 5% or greater to less than 30% with respect to a total surface area of the coating layer. For example, the first organic particles may be distributed on the surface of the coating layer in (at) an area ratio of about 5% to about 20%, or about 5% to about 15% with respect to the total surface area of the coating layer. When the area ratio of the first organic particles to the total surface area of the coating layer is less than 5%, the first organic particles may not exhibit good adhesion effects. When the area ratio of the first organic particles to the total surface area of the coating layer is 30% or greater, cell performance may be deteriorated due to increased battery resistance. The area ratio can be evaluated by measuring a ratio of the surface area covered by the first organic particle to the total surface area of the coating layer, as can be observed in a surface image of the coating layer (for example, as determined by SEM in FIG. 3).

The second organic particles may have filler properties. The second organic particles may enable formation of a uniform or substantially uniform thin film coating, in comparison with inorganic fillers, and may improve the permeability, heat resistance, and/or insulation characteristics of the separator.

In one or more embodiments, the second organic particles may be (act as) an organic filler or support in the separator. The second organic particles may support the separator (e.g., provide mechanical support) to inhibit shrinkage of the separator at high temperatures. When the second organic particles are included in the coating layer of the separator, suitable or sufficient porosity and improved mechanical characteristics may be ensured in the separator. When the separator includes a relatively small amount of a binder and a relatively large amount of the second organic particles (e.g., an organic filler) (e.g., the separator has a high ratio of second organic particles to binder), the lithium battery may have improved safety.

The second organic particles may have an average particle diameter of about 0.15 µm to about 0.35 µm. For example, the second organic particles may have an average particle diameter of about 0.2 µm to about 0.3 µm. When the average particle diameter of the second organic particles is within this range, the second organic particles may form a thin coating layer having a uniform or substantially uniform thickness, so that the separator may have a reduced thickness and an appropriate or suitable porosity.

In some embodiments, the second organic particles may have an iron (Fe) content of about 1 ppm or less. For example, a Fe content of the second organic particles may be about 0.01 ppm to about 1 ppm. The Fe content may be measured using any suitable technique, including inductively coupled plasma (ICP) analysis. The Fe content may be present in any suitable form, for example, as micron-size particles or nanoparticles of Fe metal, an inorganic Fe compound, or an organometallic Fe compound, Fe clusters, or as dissolved, dopant, or constituent atoms in the polymer. Due to the inclusion of trace Fe in the organic particles, the coating layer may contain a trace amount of Fe as described above. The separator according to embodiments of the present disclosure containing the above-described trace amount of Fe may have improved heat resistance.

In some embodiments, the second organic particles may be or include a cross-linked polymer. In some embodiments, the second organic particles may be or include a highly cross-linked polymer without a glass transition temperature ($T_g$). When such a highly cross-linked polymer is used, the separator may have improved or increased heat resistance, so that shrinkage of the porous substrate at high temperatures may be effectively suppressed or reduced. The second organic particles may have a thermal decomposition temperature of about 200° C. or greater. For example, the second organic particles may have a thermal decomposition temperature of about 200° C. to about 500° C.

The second organic particles may include, for example, an acrylate compound or derivatives thereof, a diallyl phthalate compound or derivatives thereof, a polyimide compound or derivatives thereof, a polyurethane compound or derivatives thereof, a copolymer of any of the above compounds, or a combination of any of the above compounds (including copolymers thereof). However, embodiments of the present disclosure are not limited thereto. Any suitable material available as a filler material in the art may be used. For example, the second organic particles may be or include cross-linked polystyrene particles, and/or cross-linked polymethyl methacrylate particles.

The first organic particles or the second organic particles may each independently have a core-shell structure. For example, the first organic particles may have a core-shell structure. For example, the second organic particles may have a core-shell structure. For example, the first organic particles and the second organic particles may both have a core-shell structure.

The core-shell structure may include a core portion and a shell portion. A weight of the shell portion may be about 50 wt % based on a total weight of the core portion. The core portion may include the same compound or polymer used for the first organic particles and/or second organic particles as described above. In some embodiments, the core portion may also include a material capable of effecting battery shutdown by melting at a certain or predetermined temperature (e.g., at temperatures associated with thermal runaway of the battery).

The shell portion may include a suitable material, for example, a thermoplastic resin having a melting point ($T_m$)

of about 130° C. or less. For example, the thermoplastic resin may be or include polyethylene (PE), polyvinyl chloride (PVC), polypropylene (PP), polystyrene (PS), polyacrylonitrile (PAN), styrene-acrylonitrile (SAN), acrylonitrile-butadiene-styrene (ABS), polymethylmethacrylate (PMMA), polytetrafluoroethylene (PTFE), polychlorotrifluoroethylene (PCTFE), or the like, or a combination thereof.

When the second organic particles have a core-shell structure and the shell portion of the second organic particles have a melting point of about 130° C. or less so that the second organic particles are molten at temperatures of about 130° C. or higher, the molten shell portion of the second organic particles may block pores (as present between the particles and in the separator) to provide a shutdown effect.

A weight ratio of the first organic particles to the second organic particles in the coating layer may be about 50:50 to about 10:90. For example, a weight ratio of the first organic particles to the second organic particles in the coating layer may be about 50:50 to about 20:80, or about 50:50 to about 30:70. When the weight ratio of the first organic particles to the second organic particles is less than 50:50, the contact area between the electrodes and the binder may be increased, leading to increased cell resistance. When the weight ratio of the first organic particles to the second organic particles exceeds 10:90, it may be difficult to attain an improved adhesion to the electrodes.

In some embodiments, the coating layer may further include inorganic particles, in addition to the first organic particles and the second organic particles. The inorganic particles may be filler particles and may act as a filler together with the second organic particles, may enable a uniform or substantially uniform thin film coating when mixed with the second organic particles, may improve the heat resistance of the separator, and may further reduce cell resistance.

In some embodiments, the inorganic particles may be or include a metal oxide, a metalloid oxide, or a combination thereof. For example, the inorganic particles may be one or more selected from boehmite, alumina ($Al_2O_3$), $BaSO_4$, MgO, $Mg(OH)_2$, clay (a clay mineral such as kaolinite, dickite, halloysite, nacrite, montmorillonite, nontronite, beidellite, saponite, etc.), silica ($SiO_2$), and $TiO_2$ (titania). For example, the inorganic particles may be or include AlO(OH), $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$, or a combination thereof. The coating layer may be positioned (present) on one or both surfaces of the substrate. For example, the coating layer may be arranged on only one surface of the substrate, and not the other (opposing) surface of the substrate. In some embodiments, the coating layer may be positioned (present) on both (each of the two) surfaces of the substrate. For example, the coating layer may include a first coating layer on a first surface of the substrate, and a second coating layer on a second surface of the substrate opposite the first surface.

A single (each) coating layer may have a thickness of about 0.3 µm to about 3.0 µm. For example, when the average particle sizes of the first organic particles and the second organic particles and the weight ratio of the first organic particles to the second organic particles are within the set or predetermined ranges described above, the coating layer of the separator according to embodiments of the present disclosure may have improved adhesion to the electrodes and improved binding strength to the substrate, and may also be formed to have a uniform and thin or substantially uniform and thin structure. For example, a single (each) coating layer may have a thickness of about 0.3 µm to about 2.0 µm, about 0.3 µm to about 1.5 µm, about 0.3 µm to about 1.0 µm, or about 0.3 µm to about 0.5 µm. For example, a first coating layer on one surface of the substrate may have a thickness of about 0.5 µm, and a second coating layer on the opposing surface of the substrate may have a thickness of about 0.5 µm. When the coating layer(s) (e.g., the first coating layer and/or the second coating layer) each have a thickness within these ranges, the separator including the coating layer may have improved adhesive force (adhesion) and improved air permeability. For example, the (each) coating layer may be formed to have a thickness of about 1 µm or less. Accordingly, the entire (cumulative) thickness of the separator and the resulting thickness of an electrode assembly including the separator may be reduced, thereby increasing the capacity per volume (volumetric energy density) of the battery.

In some embodiments, the coating layer may further include cellulose nanofibers. Binding of the first organic particles and the second organic particles in the coating layer may be strengthened by the inclusion of the cellulose nanofibers, and the separator may have improved heat resistance. In some embodiments, the cellulose nanofibers may be adhesive (have intrinsic adhesive properties), without the use of an additional binder polymer.

Cellulose is a main component of plant cell membranes, may constitute plant fibers, and may be referred to as "fibers" or "nanofibers". Cellulose may refer to a polymer compound formed of (e.g., consisting of) D-glucose molecules (monomers) linked in a straight chain via β-(1->4)-glycosidic linkages. Example types or kinds of cellulose fibers include cellulose nanofibers separated from nano-sized wood materials, seaweed-derived nanofibers, and bacterial celluloses obtained from bacteria by incubation. Non-limiting examples of cellulose that may be suitably used in the separator according to embodiments of the present disclosure include ethylcellulose, methylcellulose, hydroxypropyl cellulose, hydroxyethyl cellulose, hydroxypropyl methyl cellulose, hydroxyethyl methyl cellulose, carboxymethyl cellulose, cellulose acetate, cellulose triacetate, cellulose acetate phthalate, nitrocellulose, cellulose acetate butyrate, and cellulose acetate propionate.

The cellulose nanofibers may have an average diameter of about 1 nm to about 300 nm. For example, the cellulose nanofibers may have an average diameter of about 1 nm to about 200 nm, about 10 nm to about 100 nm, or about 10 nm to about 50 nm. When the average diameter of the cellulose nanofibers is less than 1 nm, it may be difficult or not possible to process cellulose into fiber form, and the cellulose nanofibers may have or impart an unsuitable or unnecessarily high viscosity. On the other hand, when the average diameter of the cellulose nanofibers exceeds 300 nm, the cellulose fibers may have poor or unsuitable surface roughness.

The cellulose nanofibers may have an average length of about 1 nm to about 500 nm. For example, the cellulose nanofibers may have an average length of about 1 nm to about 300 nm, about 10 nm to about 200 nm, or about 10 nm to about 100 nm. When the average length of the cellulose nanofibers is less than 1 nm, the cellulose nanofibers may have or impart an unsuitable or unnecessarily high viscosity. When the average length of the cellulose nanofibers exceeds 500 nm, the cellulose nanofibers may have poor or unsuitable surface roughness.

In some embodiments, the coating layer may further include third organic particles capable of mediating battery shutdown. For example, the third organic particles may clog pores in the separator, for example, by forming a blocking layer in the separator by melting at a certain or predetermined temperature, thereby blocking current flow. The term "shutdown" may refer to clogging of pores in the separator in response to a temperature rise of a lithium battery to thereby block or reduce migration of lithium ions to prevent or reduce thermal runaway. The term "shutdown temperature" may refer to the temperature at which the shutdown occurs or is configured to occur.

In one or more embodiments, when a lithium battery including the separator according to embodiments of the present disclosure is exposed to a high temperature, the third organic particles may first melt down before thermal runaway can occur, forming a polymer thin film on at least one surface of the substrate of the separator and/or permeating into the pores in the substrate of the separator to disrupt migration and transport of the electrolyte solution, thus blocking or limiting current flow and improving safety of the lithium battery.

The third organic particles may have a melting point ($T_m$) of about 100° C. to about 130° C., for example, about 110° C. to about 120° C. When the melting point of the third organic particles is lower than the shutdown temperature of the porous substrate, the pores of the porous substrate may be blocked before thermal runaway occurs in the lithium battery. Accordingly, the lithium battery may have further improved safety.

An average particle diameter of the third organic particles is not particularly limited as long as the third organic particles do not block the pores in the separator during preparation of the separator. The average particle diameter of the third organic particles may be larger than the pore size of the porous substrate of the separator. For example, the third organic particles may have an average particle diameter of about 0.1 μm to about 1 μm, about 0.1 μm to about 0.5 μm, or about 0.2 μm to about 0.3 μm.

In some embodiments, the third organic particles may be or include natural or artificial wax, a (low-melting point) polymer (such as a polyolefin), or a mixture thereof. The third organic particles may be appropriately or suitably chosen to block the pores of the separator by being melted at a target shutdown temperature to prevent or reduce further lithium ion transport. For example, the third organic particles may be formed of polyethylene wax.

In some embodiments, the coating layer may further include an organic binder polymer to enhance the binding of the second organic particles functioning as a filler. For example, the organic binder polymer may be or include polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyvinyl alcohol, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, or a mixture thereof. However, embodiments of the present disclosure are not limited thereto. An amount of the binder in the coating layer may be greater than 0 parts by weight to 50 parts by weight, for example, 1 to 30 parts by weight, or 5 to 15 parts by weight, with respect to 100 parts by weight of the total organic particles comprising the first organic particles and the second organic particles.

A solvent used with the organic binder polymer may have a solubility index similar to that of the organic binder polymer, and may have a low boiling point. These solubility properties may enable uniform or substantially uniform mixing, and easy removal of the solvent. For example, the solvent may be acetone, tetrahydrofuran (THF), methylene chloride, chloroform, dimethylformamide (DMF), N-methyl-2-pyrrolidone (NMP), cyclohexane, water, or a mixture thereof.

The organic binder polymer included in the coating layer may be an aqueous binder having a glass transition temperature ($T_g$) of about −50° C. or higher, and may be present as particles (e.g., may be in particle format) after coating and drying. In some embodiments, for example, the organic binder polymer may be an aqueous binder including acrylate (e.g., an acrylate polymer) and/or styrene (e.g., a styrene polymer). The aqueous binder may enable a uniform or substantially uniform coating and improved air permeability. The organic binder polymer that may be added in the coating layer may be, for example, polyvinyl alcohol, polyacrylic acid, polyacrylamide, and/or polyvinylpyrrolidone. These binders may enhance binding of the first organic particles and the second organic particles, and adhesion to the separator.

The coating layer may have a single-layer structure or a multilayer structure. The multilayer structure may be a 2-layer structure, a 3-layer structure, or a 4-layer structure. However, embodiments of the present disclosure are not limited to these structures. Any suitable structure may be chosen according to desired or suitable characteristics of the separator.

When coating layers are arranged on opposite (both) surfaces of the separator, the coating layers may have the same composition. When the coating layers on opposite surfaces of the separator have the same composition, both surfaces of the separator may adhere with substantially the same force to the corresponding electrode active material layers, such that volume changes of the lithium battery may be uniformly or substantially uniformly suppressed.

Separator Preparation Method

According to one or more embodiments of the present disclosure, a method of preparing the separator includes: (a) preparing a slurry including the first organic particles and the second organic particles; (b) coating the slurry on at least one surface of a substrate, and (c) drying the coated resultant (e.g., drying the slurry on the at least one surface of the substrate).

In one or more embodiments, in step (b), the slurry may be coated on opposite (both) surfaces of the substrate. For example, the slurry may be coated on the opposite (both) surfaces of the substrate at the same time (e.g., simultaneously).

In some embodiments, the slurry may further include cellulose nanofibers and/or third organic particles having a melting point ($T_m$) of about 100° C. to about 130° C.

The separator may be formed by coating a slurry on the porous substrate. The method of coating the slurry is not particularly limited, and any suitable coating method available in the art may be used. For example, the separator may be formed by printing, compression, press fitting, blade coating, brush coating, dipping, spraying, and/or casting.

In one or more embodiments, immediately after or at substantially the same time as coating of the slurry for forming the porous coating layer, an aqueous dispersion solution of an aqueous binder compound may be coated on the slurry to form an adhesive layer. In some embodiments, a dispersion medium for the dispersion solution for forming the adhesive layer may be water.

In one or more embodiments, the drying may be performed using any suitable method available in the art. For example, the drying may be performed using a batch method, or in a continuous or substantially continuous manner using an oven or a heating chamber in an appropriate or suitable temperature range (e.g., in consideration of the vapor pressure of the solvent used in the slurry). The drying may be to remove most or substantially all of the solvent from the slurry. The drying time may be selected to be as short as possible in terms of productivity. For example, the drying may be performed for about 1 minute or less, or about 30 seconds or less.

In one or more embodiments, the separator may have an increase in air permeability (an increase in Gurley value) of about 15 seconds to about 50 seconds per 100 mL (cc) of air with respect to the uncoated porous substrate as a reference. For example, the separator may have an air permeability increase rate of about 15 seconds to about 40 seconds per 100 mL of air, or about 15 seconds to about 30 seconds per 100 mL of air. When the increase in air permeability of the separator is within these ranges, internal resistance increase of the lithium battery may be effectively suppressed.

In one or more embodiments, the separator may have a breakdown voltage (BDV) of about 0.5 kV to about 3.0 kV. For example, the separator may have a BDV of about 0.6 kV to about 2.5 kV, about 0.7 kV to about 2.0 kV, or about 0.8 kV to about 1.8 kV. When the separator has a BDV within these ranges, the risk of a short-circuit failure or an open circuit voltage (OCV) drop caused by a foreign substance in the battery may be decreased.

In one or more embodiments, a BDV increase due to the presence of the coating layer in the separator may be about 0.1 kV or greater, for example, about 0.13 kV or greater, about 0.16 kV or greater, or about 0.16 kV to about 0.2 kV. In general, inorganic particles have conductive characteristics at high voltages, and may not efficiently enhance insulation characteristics. However, the separator according to embodiments of the present disclosure may enhance insulation characteristics with the coating layer including (e.g., consisting of) organic particles, thereby providing improved insulation characteristics despite the reduction in insulating characteristics associated with a thin-film coating.

In one or more embodiments, the separator may have a water content of about 400 ppm or less. For example, the separator may have a water content of about 350 ppm or less, or about 200 ppm to about 350 ppm. For example, the separator may have a water content per separator unit thickness of about 40 ppm/μm or less. Moisture present in a battery may cause cell deterioration due to the generation of hydrogen fluoride (HF) and/or other side reaction byproducts. In one or more embodiments, the separator using organic particles may inhibit moisture adsorption and/or moisture retention.

The separator according to embodiments of the present disclosure prepared using the above-described method may be used as a separator in a lithium battery.

Lithium Battery

According to embodiments of the present disclosure, a lithium battery includes: a positive electrode; a negative electrode, and the separator according to embodiments of the present disclosure between the positive electrode and the negative electrode. By the inclusion of the separator according to embodiments of the present disclosure, the lithium battery may have increased adhesion between the electrodes (positive electrode and negative electrode) and the separator, and volume changes of the lithium battery during charging and discharging may be suppressed or reduced. Accordingly, the risk of lithium battery deterioration caused by volume changes may be prevented or reduced, and the battery may have improved safety and lifetime characteristics.

In one or more embodiments, the lithium battery may have a 3-point bending strength of about 100 N to about 700 N. For example, the lithium battery may have a 3-point bending strength of about 150 N to about 700 N, about 200 N to about 700 N, or about 300 N to about 700 N. When the bending strength of the lithium battery is 100 N or less, cell deformation during charging and discharging may not be suppressed or reduced due to the low adhesion strength between the separator and the electrodes, and the lithium battery may be deformed.

In some embodiments, the lithium battery may be manufactured in the following manner.

First, a negative active material, a conducting agent, a binder, and a solvent may be mixed together to prepare a negative active material composition. The negative active material composition may be directly coated on a metallic current collector and dried to form a negative electrode plate. In some embodiments, the negative active material composition may be cast on a separate support to form a negative active material film. This negative active material film may then be separated from the support and laminated on a metallic current collector to thereby form a negative electrode plate. The negative electrode is not limited to the above-described forms, and may have any form.

The negative active material may be a non-carbonaceous material. For example, the negative active material may include at least one selected from lithium metal, a metal that is alloyable with lithium, alloys and oxides of a metal that is alloyable with lithium, and combinations thereof.

Non-limiting examples of the metal alloyable with lithium include silicon (Si), tin (Sn), aluminum (Al), germanium (Ge), lead (Pb), bismuth (Bi), antimony (Sb), a Si-Y alloy (wherein Y may be an alkali metal, an alkali earth metal, a Group 13 to Group 16 element excluding Si, a transition metal, a rare earth element, or a combination thereof), and a Sn-Y alloy (wherein Y may be or include an alkali metal, an alkali earth metal, a Group 13 to Group 16 element excluding Sn, a transition metal, a rare earth element, or combinations thereof). In some embodiments, Y may be or include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

In some embodiments, for example, the negative active material may be a lithium titanium oxide, a vanadium oxide, and/or a lithium vanadium oxide.

In some embodiments, for example, the negative active material may be $SnO_2$ and/or $SiO_x$ (wherein $0<x\leq2$).

In some embodiments, for example, the negative active material may be at least one selected from Si, Sn, Pb, Ge, Al, SiO, (wherein $0<x\leq2$), $SnO_y$ (wherein $0<y\leq2$), $Li_4Ti_5O_{12}$, $TiO_2$, $LiTiO_3$, and $Li_2Ti_3O_7$. However, embodiments of the present disclosure are not limited thereto. Any non-carbonaceous negative active material available in the art may be used.

In some embodiments, for example, the negative active material may be a composite of a non-carbonaceous negative active material (as described above) and a carbonaceous material. For example, the negative active material may further include, in addition to a non-carbonaceous negative active material as described above, a carbonaceous negative active material.

The carbonaceous material may be or include crystalline carbon, amorphous carbon, or a mixture thereof. The crystalline carbon may be, for example, graphite (such as natural graphite and/or artificial graphite) in non-shaped (e.g., without any particular shape), plate-like, flake-like, spherical, and/or fibrous form. The amorphous carbon may be soft carbon (carbon sintered at low temperatures), hard carbon, meso-phase pitch carbides, sintered cokes, or the like.

The conducting agent may be or include, for example, natural graphite, artificial graphite, carbon black, acetylene black, Ketjenblack, carbon fibers, and/or powder and/or fibers of a metal (such as copper, nickel, aluminum, silver, or the like). For example, the conducting agent may be used together with one or more conductive material such as polyphenylene derivatives. However, embodiments of the present disclosure are not limited thereto. Any suitable conducting agent available in the art may be used. The above-listed examples of the crystalline carbonaceous material may be used together as an additional conducting agent.

In some embodiments, for example, the binder may be a vinylidene fluoride/hexafluoropropylene copolymer, polyvinylidene fluoride (PVDF), polyacrylonitrile, polymethylmethacrylate, polytetrafluoroethylene, a styrene butadiene rubber polymer, or any mixture thereof. However, embodiments of the present disclosure are not limited thereto. Any suitable material available as a binder in the art may be used.

For example, the solvent may be or include N-methylpyrrolidone, acetone, water, or a mixture thereof. However, embodiments of the present disclosure are not limited thereto. Any suitable material available as a solvent in the art may be used.

The amounts of the positive active material, the conducting agent, the binder, and the solvent may be the same as used in lithium batteries in the related art. In some embodiments, at least one of the conducting agent, the binder, and the solvent may be omitted according to the desired use and structure of the lithium battery.

The composition of the binder used in the preparation of the negative electrode may be the same as included in the coating layer of the separator.

Next, a positive active material, a conducting agent, a binder, and a solvent may be mixed together to prepare a positive active material composition. The positive active material composition may be directly coated on a metallic current collector and dried to form a positive electrode plate. In some embodiments, the positive active material composition may be cast on a separate support to form a positive active material film. This positive active material film may then be separated from the support and laminated on a metallic current collector to thereby form a positive electrode plate.

The positive active material may include at least one selected from lithium cobalt oxide, lithium nickel cobalt manganese oxide, lithium nickel cobalt aluminum oxide, lithium iron phosphate, and lithium manganese oxide. However, embodiments of the present disclosure are not limited thereto. Any positive active material available in the art may be used.

In some embodiments, for example, the positive active material may be at least one compound represented by one of the following formulae: $Li_aA_{1-b}B_bD_2$ (wherein $0.90 \leq a \leq 1.8$, and $0 \leq b \leq 0.5$); $Li_aE_{1-b}B_bO_{2-c}D_c$ (wherein $0.90 \leq a \leq 1.8$, $0 \leq b \leq 0.5$, and $0 \leq c \leq 0.05$); $LiE_{2-b}B_bO_{4-c}D_c$ (wherein $0 \leq b \leq 0.5$, and $0 \leq c \leq 0.05$); $Li_aNi_{1-b-c}Co_bB_cD_a$ (wherein $0.90 \leq a \leq 1.8$, $0 \leq b \leq 0.5$, $0 \leq c \leq 0.05$, and $0 < a \leq 2$); $Li_aNi_{1-b-c}Co_bB_cO_{2-a}X_a$ (wherein $0.90 \leq a \leq 1.8$, $0 \leq b \leq 0.5$, $0 \leq c \leq 0.05$, and $0 < a < 2$); $Li_aNi_{1-b-c}Co_bB_cO_{2-a}X_2$ (wherein $0.90 \leq a \leq 1.8$, $0 \leq b \leq 0.5$, $0 \leq c \leq 0.05$, and $0 < a < 2$); $Li_aNi_{1-b-c}Mn_bB_cD_a$ (wherein $0.90 \leq a \leq 1.8$, $0 \leq b \leq 0.5$, $0 \leq c \leq 0.05$, and $0 < a \leq 2$); $Li_aNi_{1-b-c}Mn_bB_cO_{2-a}F_a$ (wherein $0.90 \leq a \leq 1.8$, $0 \leq b \leq 0.5$, $0 \leq c \leq 0.05$, and $0 < a < 2$); $Li_aNi_{1-b-c}Mn_bB_cO_{2-a}F_2$ (wherein $0.90 \leq a \leq 1.8$, $0 \leq b \leq 0.5$, $0 \leq c \leq 0.05$, and $0 < a < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiM'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; X may be F, S, P, or a combination thereof; G may be Al, Cr, Mn, Fe, Mg, La, Ce, Sr, V, or a combination thereof; Q may be Ti, Mo, Mn, or a combination thereof; M' may be Cr, V, Fe, Sc, Y, or a combination thereof; and J may be V, Cr, Mn, Co, Ni, Cu, or a combination thereof.

In some embodiments, the positive active material may have or further include a surface coating layer (hereinafter, also referred to as "coating layer"). In some embodiments, a mixture of a compound without a coating layer and a compound having a coating layer, the compounds being selected from the compounds listed above, may be used. In some embodiments, the coating layer may include at least one compound selected from an oxide, a hydroxide, an oxyhydroxide, a oxycarbonate, and a hydroxycarbonate of any suitable coating element. In some embodiments, the compounds for the coating layer may be amorphous or crystalline. In some embodiments, the coating element for the coating layer may be or include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any suitable method that does not adversely affect the physical properties of the positive active material when a compound of the coating element is used. For example, the coating layer may be formed using a spray coating method or a dipping method. Other suitable coating methods are known and available in the related art.

In some embodiments, for example, the positive active material may be $LiNiO_2$, $LiCoO_2$, $LiMn_xO_{2x}$ (wherein $x=1$ or 2), $LiNi_{1-x}Mn_xO_2$ (wherein $0<x<1$), $LiNi_{1-x-y}Co_xMn_yO_2$ (wherein $0 \leq x \leq 0.5$ and $0 \leq y \leq 0.5$), $LiFeO_2$, $V_2O_5$, $TiS_2$, and/or $MoS_2$. In some embodiments, the positive active material may be $LiCoO_2$, $LiMn_xO_{2x}$ (wherein $x=1$ or 2), $LiNi_{1-x}Mn_xO_{2x}$ (wherein $0<x<1$), $LiNi_{1-x-y}Co_xMn_yO_2$ (wherein $0 \leq x \leq 0.5$ and $0 \leq y \leq 0.5$), and/or $LiFePO_4$.

The conducting agent, the binder, and the solvent used in the positive active material composition may each independently be the same as those used in the negative active material composition. In one or more embodiments, a plasticizer may be further added to the positive active material composition and/or the negative active material composition to obtain electrode plates including pores.

The amounts of the positive active material, the conducting agent, the binder, and the solvent may be similar to amounts used in the related art. In some embodiments, at least one of the conducting agent, the binder, and the solvent may be omitted depending on the intended use and the structure of the lithium battery.

The composition of the binder used in the preparation of the positive electrode may be the same as that included in the coating layer of the separator.

Next, the separator according to embodiments of the present disclosure may be positioned between the positive electrode and the negative electrode to prepare an electrode assembly.

In the electrode assembly including the positive electrode, the separator, and the negative electrode, as described above, the separator between the positive electrode and the negative electrode may include a substrate and a coating layer on at least one surface of the substrate, wherein the coating layer may include first organic particles and second organic particles as described above, and an average particle diameter of the first organic particles may be larger than an average particle diameter of the second organic particles, and the first organic particles may protrude or extend to a height of about 0.1 μm to about 0.5 μm from a dented portion of a surface of the coating layer and may be distributed in the surface of the coating layer in an area ratio of about 5% or greater to less than 30% with respect to a total surface area of the coating layer.

The separator according to embodiments of the present disclosure may be positioned between the positive electrode and the negative electrode. In some embodiments, an electrode assembly including the positive electrode, the separator according to embodiments of the present disclosure, and the negative electrode as described above may be wound in a jelly roll type (assembly), which may then be put into a battery case or a pouch, and may thermally soften under pressure. After pre-charging, the charged jelly roll cell may be further charged and discharged under pressure to complete a formation process. The separator may be prepared using the method described above.

Next, an electrolyte may be prepared.

The electrolyte may be in a liquid or gel state. For example, the electrolyte may be an organic electrolyte solution. In some embodiments, the electrolyte may be in a solid state. For example, the electrolyte may be or include boron oxide, lithium oxynitride, or the like. However, embodiments of the present disclosure are not limited thereto. Any suitable material available as a solid electrolyte in the art may be used. In one or more embodiments, the solid electrolyte may be formed on the negative electrode by, for example, sputtering.

For example, the organic electrolyte solution may be prepared by dissolving a lithium salt in an organic solvent.

The organic solvent may be any suitable solvent available as an organic solvent in the art. For example, the organic solvent may be or include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof.

In one or more embodiments, the lithium salt may be any material available as a lithium salt in the art. For example, the lithium salt may be or include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a mixture thereof.

Referring to FIG. 1, a lithium battery 1 according to an embodiment of the present disclosure may include a positive electrode 3, a negative electrode 2, and a separator 4. The positive electrode 3, the negative electrode 2, and the separator 4 may be wound or folded, and then sealed in a battery case 5. The battery case 5 may be filled with an organic electrolyte solution and sealed with a cap assembly 6, thereby completing the manufacture of the lithium battery 1. The battery case 5 may be a cylindrical type or format, a rectangular type or format, or a thin-film type or format. For example, the lithium battery 1 may be a thin-film type battery. The lithium battery 1 may be a lithium ion battery. In some embodiments, for example, the lithium battery 1 may be a lithium polymer battery.

In one or more embodiments, the separator may be positioned between the positive electrode and the negative electrode to thereby form an electrode assembly. In some embodiments, the electrode assembly may be stacked in layers in a bi-cell structure, or wound in a jelly roll type (assembly), and may then be impregnated with an organic electrolyte solution. The resultant assembly may be put into a pouch and hermetically sealed, thereby completing the manufacture of a lithium ion polymer battery.

In some embodiments, a plurality of electrode assemblies may be stacked to form a battery pack, which may be used in any device designed for high capacity and high output, for example, in a laptop computer, a smart phone, or an electric vehicle.

The lithium battery may have improved high rate characteristics and lifetime characteristics, and thus may be suitably used in an electric vehicle (EV), for example, in a hybrid vehicle such as a plug-in hybrid electric vehicle (PHEV).

One or more embodiments of the present disclosure will now be described in more detail with reference to the following examples. However, these examples are provided only for illustrative purposes, and are not intended to limit the scope of the present disclosure.

Preparation of separator

PREPARATION EXAMPLE 1

15% (by Area Ratio) of First Organic Particles with Respect to Total Surface Area of Coating Layer 75 parts by weight of cross-linked polymethylmethacrylate (PMMA, available from ZEON) having an average particle diameter (D50) of about 0.23 μm as second organic particles (filler), 25 parts by weight of polystyrene (PS, ZEON) having an average particle diameter (D50) of about 0.4 μm as first organic particles (electrode adhesive), and 10 parts by weight of polyvinyl alcohol (PVA, available from Kuraray) as a binder were mixed together to prepare a slurry for forming a coating layer. The first organic particles had a degree of swelling of about 800% when left in an electrolyte solution at about 60° C. for about 72 hours.

The slurry for forming a coating layer was coated by gravure printing on opposite (both) surfaces of a polyethylene porous substrate having a BDV of about 0.85 KV, a thickness of about 7.5 μm and an air permeability (Gurley value) of about 110 seconds/100 cc to form a coating layer including a blend of the first organic particles and the second organic particles on each of the surfaces of the porous substrate, each coating layer having a thickness of about 0.5 µm, thereby forming a separator. The thicknesses of the coating layers on the opposite surfaces of the separator were 0.5 µm and 0.5 µm, respectively. The separator had a thickness of about 8.5 µm. The separator had an air permeability (Gurley value) of about 130 seconds/100 cc, i.e., the time elapsed to flow 100 cc of air through the separator was about 130 seconds, and the separator had a BDV of about 1.01 kV and a water content of about 287 ppm.

Figure 5:
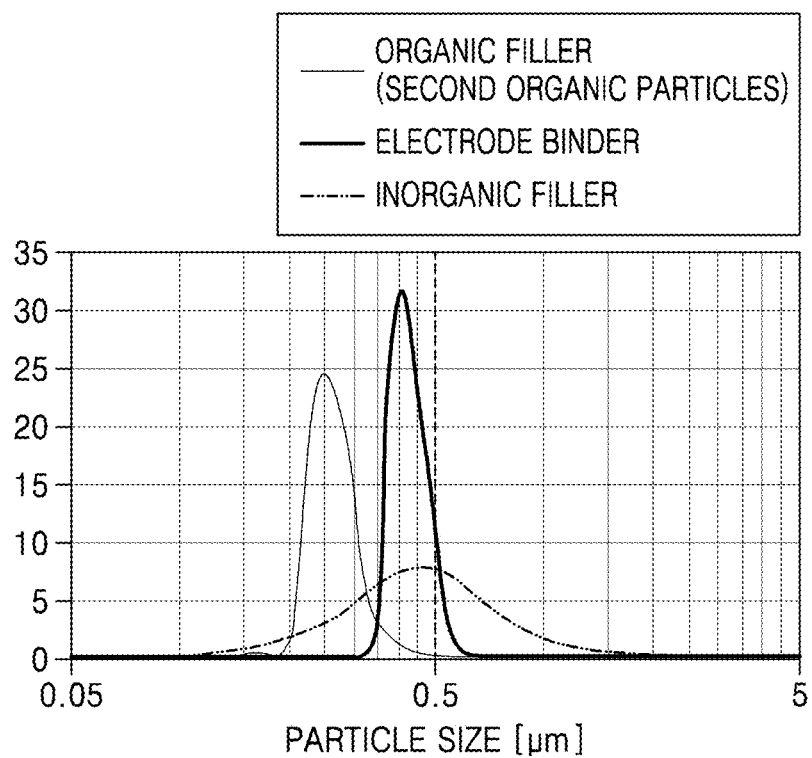
FIG. 5 is a graph illustrating the particle diameter distribution of second organic particles used in Preparation Example 5 and an inorganic filler used in Comparative Preparation Example 1.

The particle diameter distribution of the second organic particles (as an organic filler) according to Preparation Example 1 is shown in FIG. 5, together with that of an inorganic filler used in Comparative Preparation Example 1, as described below.

Referring to FIG. 5, the second organic particles (as a filler) were found to have a uniform or substantially uniform particle diameter distribution, while the inorganic filler used in Comparative Preparation Example 1 was found to have a wide particle diameter distribution.

PREPARATION EXAMPLE 2

7% (by Area Ratio) of First Organic Particles with Respect to Total Surface Area of Coating Layer A separator was prepared in substantially the same manner as in Preparation Example 1, except that 85 parts by weight of the second organic particles and 15 parts by weight of the first organic particles were mixed, and polymethylmethacrylate was used as the binder instead of polyvinyl alcohol (PVA).

Preparation Example 3: 28% (by Area Ratio) of First Organic Particles with Respect to Total Surface Area of Coating Layer A separator was prepared in substantially the same manner as in Preparation Example 1, except that 54 parts by weight of the second organic particles and 46 parts by weight of the first organic particles were mixed, and polymethylmethacrylate was used as the binder instead of polyvinyl alcohol (PVA).

PREPARATION EXAMPLE 4

Coating Layer Thickness of 1.0 µm on each Substrate Surface

A separator was prepared in substantially the same manner as in Preparation Example 1, except that the slurry for forming the coating layer was coated on the opposite surfaces of the porous substrate to a thickness of about 1.0 µm to form coating layers each having a thickness of about 1.0 µm.

COMPARATIVE PREPARATION EXAMPLE 1

Use of First Organic Particles and Inorganic Particles

A separator was prepared in substantially the same manner as in Preparation Example 1, except that alumina ($Al_2O_3$, AES-11, available from Sumitomo Chemical Co., Ltd.) as inorganic particles having an average particle diameter of about 0.4 µm to about 0.6 µm (D50 on a volume basis) was used instead of the second organic particles.

COMPARATIVE PREPARATION EXAMPLE 2

Use of Inorganic Particles

A commercially available separator (SK, T14-715CB) with a ceramic coating layer having a thickness of about 2 µm on a surface of a porous substrate having a thickness of about 12 µm was used.

COMPARATIVE PREPARATION EXAMPLE 3

3% (by Area Ratio) of First Organic Particles with Respect to Total Surface Area of Coating Layer A separator was prepared in substantially the same manner as in Preparation Example 1, except that 97 parts by weight of the second organic particles and 3 parts by weight of the first organic particles were mixed.

COMPARATIVE PREPARATION EXAMPLE 4

35% (by Area Ratio) of First Organic Particles with Respect to Total Surface Area of Coating Layer A separator was prepared in substantially the same manner as in Preparation Example 1, except that 45 parts by weight of the second organic particles and 55 parts by weight of the first organic particles were mixed.

COMPARATIVE PREPARATION EXAMPLE 5

Coating with Inorganic Particles having an Average Particle Diameter of 0.35 µm

A separator was prepared in substantially the same manner as in Preparation Example 1, except that inorganic particles (alumina, $Al_2O_3$, Nabaltec) having an average particle diameter of about 0.35 µm (D50 on a volume basis) were used instead of the second organic particles.

COMPARATIVE PREPARATION EXAMPLE 6

Coating with Inorganic Particles having an Average Particle Diameter of 0.15 µm

A separator was prepared in substantially the same manner as in Preparation Example 1, except that inorganic particles (alumina, $Al_2O_3$, Evonik) having an average particle diameter of about 0.15 µm (D50 on a volume basis) were used instead of the second organic particles.

COMPARATIVE PREPARATION EXAMPLE 7

Coating with Inorganic Particle having an Average Particle Diameter of 0.35 µm and Coating Layer Thickness of 1.0 µm on each Substrate Surface A separator was prepared in substantially the same manner as in Preparation Example 1, except that inorganic particles (alumina, $Al_2O_3$, Nabaltec) having an average particle diameter of about 0.35 µm (D50 on a volume basis)

were used instead of the second organic particles, and the slurry for forming a coating layer was coated on opposite surfaces of the porous substrate to form coating layers each having a thickness of 1.0 μm.

Manufacture of Lithium Battery

EXAMPLE 1

Manufacture of Negative Electrode 97 wt % of graphite particles having an average particle diameter of about 25 μm (C1SR, Nippon Carbon), 1.5 wt % of a styrene-butadiene rubber (SBR) binder (Zeon), and 1.5 wt % of carboxymethylcellulose (CMC, NIPPON A&L) were mixed together, added to distilled water, and then agitated with a mechanical stirrer for about 60 minutes to thereby prepare a negative active material slurry. The slurry was coated on a copper current collector having a thickness of about 10 μm with a doctor blade, dried in a 100° C. in a hot-air drier for about 0.5 hours, dried further under vacuum at about 120° C. for about 4 hours, and then roll-pressed to manufacture a negative electrode plate.

Manufacture of Positive Electrode 97 wt % of $LiCoO_2$, 1.5 wt % of carbon black powder as a conducting agent, and 1.5 wt % of polyvinylidene fluoride (PVdF, SOLVAY) were mixed together, added to N-methyl-2-pyrrolidone solvent, and then agitated with a mechanical stirrer for about 30 minutes to thereby prepare a positive active material slurry. The slurry was coated on an aluminum current collector having a thickness of about 20 μm with a doctor blade, dried in a 100° C. hot-air drier for about 0.5 hours, dried further under vacuum at about 120° C. for about 4 hours, and then roll-pressed to manufacture a positive electrode plate.

Electrode Assembly Jelly Roll

The separator prepared in Preparation Example 1 was positioned between the positive electrode plate and the negative electrode plate, and then wound to form an electrode assembly in the form of a jelly roll. This jelly roll was put into a pouch. After an electrolyte solution was injected into the pouch, the pouch was vacuum-sealed.

The electrolyte solution included 1.3 M $LiPF_6$ dissolved in a mixed solvent of ethylene carbonate (EC), ethyl methyl carbonate (EMC), and diethyl carbonate (DEC) in a ratio of 3:5:2 (by volume).

While thermally softening the jelly roll in the pouch at about 70° C. under a pressure of 250 kgf/cm² for about 1 hour, the jelly roll was pre-charged to about 50% SOC (State of Charge).

Then, after degassing the pouch, the jelly roll was charged with a constant current at 0.2C at about 45° C. under a pressure of 200 kgf/cm² for about 1 hour up to a voltage of about 4.3 V, then charged with a constant voltage of 4.3 V to a cutoff current of 0.05C, and then discharged with a constant current of 0.2C down to a voltage of 3.0 V. This charge and discharge cycle was repeated 5 times to complete a formation process.

EXAMPLES 2 to 4

Additional lithium batteries were manufactured in substantially the same manner as in Example 1, except that the separators prepared in Preparation Examples 2 to 4 were used, respectively.

COMPARATIVE EXAMPLES 1 to 7

Lithium batteries were manufactured in substantially the same manner as in Example 1, except that the separators prepared in Comparative Preparation Examples 1 to 7 were used, respectively.

EVALUATION EXAMPLE 1

Evaluation of Surface Morphology of Separator

A surface and a cross-section of the separator of Preparation Example 1 were analyzed by scanning electron microscopy (SEM). The results are shown in FIGS. 3 and 4.

Referring to FIGS. 3 and 4, in the separator of Preparation Example 1, the first organic particles were found to protrude from the surface of the separator in embossed form. Referring to FIG. 4, the first organic particles form a protruded portion (101) that protrudes or extends to a height difference (103) of 0.1 μm to 0.5 μm from a dented portion (102) between the first organic particles of a surface of the porous coating layer.

Various morphological characteristics of the coating layer of each of the separators prepared in Preparation Examples 1 to 4 and Comparative Preparation Examples 5 and 6 were analyzed by SEM. The results are shown in Table 1.

TABLE 1

| Example | First organic particles | | | | Second organic particles |
|---|---|---|---|---|---|
| | Area ratio (%) | Number per area (13 μm × 9 μm) | Degree of swelling (%) | Particle diameter (μm) | Particle diameter (μm) |
| Preparation Example 1 | 15 | 90 | 800 | 0.4 | 0.23 |
| Preparation Example 2 | 7 | 40 | 1000 | 0.6 | 0.30 |
| Preparation Example 3 | 28 | 160 | 300 | 0.5 | 0.20 |
| Preparation Example 4 | 15 | 90 | 800 | 0.4 | 0.23 |
| Comparative Preparation Example 5 | 15 | 80 | 800 | 0.4 | 0.35 (Inorganic particles) |
| Comparative Preparation Example 6 | 15 | 80 | 800 | 0.4 | 0.15 (Inorganic particles) |

Referring to Table 1, in the separators of Preparation Examples 1 to 3 including first organic particles and second organic particles, an area ratio of the first organic particles was found to be about 15%, about 7%, and about 28%, respectively, with respect to the total surface area of the substrate. The number of the first organic particles per unit area (13 μm×9 μm) was found to be about 90, about 40, and about 160, respectively, in the separators of Preparation Examples 1 to 3. In the separator of Preparation Example 4 having a thick coating layer of about 1.0 μm on each substrate surface, the area ratio of the first organic particles, and the number thereof per unit area (13 μm×9 μm) were found to be similar to those in the separator of Preparation Example 1.

In the separators of Comparative Preparation Examples 5 and 6 using the inorganic particles instead of the second organic particles, the area ratio of the first organic particles and the number thereof per unit area (13 μm×9 μm) were also found to be similar to those in the separator of Preparation Example 1. However, the separator of Comparative Preparation Example 5 using the inorganic particles having an average particle diameter (D50) of about 0.35 μm was found to include residual local uncoated regions.

EVALUATION EXAMPLE 2

Evaluation of Insulation Characteristics of Separator

The insulation characteristics of the separator in each of the lithium batteries of Examples 1 to 4 and Comparative Examples 1 to 7 were evaluated by a breakdown voltage test. The results are shown in Table 2. The BDV test was performed using a TOS5301 (available from KIKISUI) while applying an increasing voltage to 0.3 kV over 8 seconds at a constant current of 0.3 mA (AC mode) to each separator placed between SUS plates, to thereby measure a voltage at a short point, at which the voltage increase (ramp) was stopped.

EVALUATION EXAMPLE 3

Evaluation of Air Permeability (Gurley Value) of Separator

The lithium batteries of Examples 1 to 4 and Comparative Examples 1 to 7 after the formation process were disassembled to take the jelly roll from each pouch. The separator was removed from each of the jelly rolls and then used for air permeability evaluation.

The air permeability (Gurley value) was measured as the time (in seconds) it takes for 100 cc of air to pass through each separator, using a measurement equipment (EG01-55-1MR, available from ASAHI SEIKIO). The results are shown in Table 2.

EVALUATION EXAMPLE 4

Evaluation of water Content of Separator

The lithium batteries of Examples 1 to 4 and Comparative Examples 1 to 7 after the formation process were disassembled to take the jelly roll from each pouch. The separator was removed from each of the jelly rolls and then used for water content measurement. The results are shown in Table 2. The water content measurement was performed according to a Karl-Fischer titration method.

EVALUATION EXAMPLE 5

Evaluation of Bending Strength (Adhesion) between Negative Electrode and Separator The lithium batteries of Examples 1 to 4 and Comparative Examples 1 to 7 after the formation process were disassembled to take the jelly roll from each pouch. The adhesion between the separator and the positive active material layer and the negative active material layer was measured as a bending strength according to a 3-point bend flexure test (INSTRON). In particular, each pouched cell after the formation process was pressed down at a rate of 5 mm/min to measure a Max value (N, MPa) from the zero-point to a 5 mm-bending. The results are shown in Table 2.

TABLE 2

| Example | Insulation characteristics (BDV, kV) | Increase in air permeability (sec/100 cc) | Water content (ppm) | Water content per unit thickness of separator (ppm/μm) | Bending strength (adhesion, N) |
|---|---|---|---|---|---|
| Example 1 | 1.01 (Δ0.16) | Δ20 | 287 | 33.765 | 350 |
| Example 2 | 0.976 | — | 241 | 28.353 | 270 |
| Example 3 | 1.068 | — | 250 | 29.412 | 456 |
| Example 4 | 1.034 | Δ44 | 330 | 34.737 | 376 |
| Comparative Example 1 | 0.874 | — | — | — | 208 |
| Comparative Example 2 | 0.734 | — | — | — | 58 |
| Comparative Example 3 | 0.831 | — | — | — | 220 |
| Comparative Example 4 | 1.087 | — | — | — | 510 |
| Comparative Example 5 | — | — | — | — | — |
| Comparative Example 6 | 0.910 (Δ0.06) | Δ33 | 2429 | 285.76 | 297 |
| Comparative Example 7 | 0.752 | — | — | — | 185 |

Referring to Table 2, the separators according to Examples 1 to 4 prepared using the second organic particles as a filler were each found to have a breakdown voltage (BDV) of about 0.9 kV or greater, while the separator of Comparative Example 1 using the inorganic particles as a filler and the separator of Comparative Example 2 including only inorganic particles were each found to have a low BDV of less than 0.9 kV. The separator used in Example 1 had a BDV increase due to the coating layer of about 0.16 kV, while the separator according to Comparative Example 6, using the inorganic particles of 0.15 µm as a filler, had a low BDV increase due to the coating layer of 0.06 kV. The separator used in Comparative Example 7, using the inorganic particles of 0.35 µm as a filler, was also found to have a low BDV of about 0.752 kV. These results support that a separator according to one or embodiments using the second organic particles as a filer may have improved insulation characteristics, as compared with when inorganic particles are used as a filler.

The separator used in Example 1, using the second organic particles as a filler, had an increase in air permeability of less than Δ30, while the separator used in Comparative Example 6, using the inorganic particles of 0.15 µm as a filler, had a high increase in air permeability of Δ30 or greater. The separator used in Example 4, having a large coating layer thickness of about 1.0 µm on each substrate surface, had a slightly high increase in air permeability of Δ44.

The separators used in Examples 1 to 4, using the second organic particles as a filler, were each found to have a water content of 400 ppm or less, while the separator used in Comparative Example 6 had a high water content of 2429 ppm.

The lithium batteries of Examples 1 to 4, using the second organic particles as a filler, were each found to have a bending strength of about 250 N to about 500 N, while the lithium battery of Comparative Example 1, using the inorganic particles as a filler, and the lithium battery of Comparative Example 2, including only the inorganic particles, were found to have a low bending strength of about 208 N and about 58 N, respectively. The lithium battery of Comparative Example 3, using the separator including 3% (by area ratio) of the first organic particles with respect to a total surface area of the coating layer, was found to have a low bending strength of about 220 N, while the lithium battery of Comparative Example 4, using the separator including 35% (by area ratio) of the first organic particles with respect to the total surface area of the coating layer, was found to have an excessively high bending strength of 510 N.

In conclusion, the separators according to embodiments of the present disclosure and lithium batteries including the separator according to embodiments of the present disclosure were found to have improved insulation characteristics, water content, and adhesion, as compared with separators and lithium batteries according to the related art.

EVALUATION EXAMPLE 6

Charge-Discharge Cycle Characteristic Evaluation

The lithium batteries of Examples 1 to 3 and Comparative Example 4 were subjected to charge-discharge cycles, in which each lithium battery was charged at 0.2C with a 4.4 V/0.02C cutoff and then discharged at 0.2C with a 2.75 V cutoff (25° C., 1 atm) at the $1^{st}$, $50^{th}$, $100^{th}$, $150^{th}$, $200^{th}$, $250^{th}$, $300^{th}$, $350^{th}$, $400^{th}$, and $450^{th}$ cycles, and charged at 1C with a 4.4 V/0.1C cutoff and then discharged at 1C with a 3V cutoff on all other cycles. The results are shown in FIG. 6.

Figure 6:
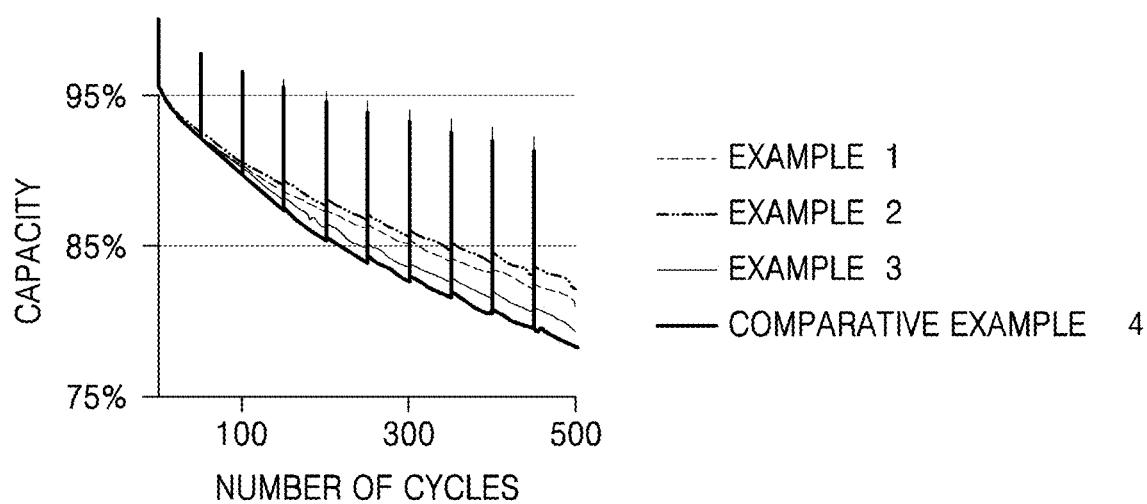
FIG. 6 is a graph illustrating results of charge-discharge cycles of lithium batteries according to Examples 1 to 3 and Comparative Example 4.

Referring to FIG. 6, the lithium batteries of Examples 1, 2, and 3, including 15%, 7%, and 28% of the first organic particles with respect to the total surface area of the coating layer, respectively, were found to have improved charge and discharge characteristics, as compared with the lithium battery of Comparative Example 4 including 35% of the first organic particles with respect to the total surface area of the coating layer.

As described above, using a separator including a coating layer having the disclosed structure according to embodiments of the present disclosure may have improved adhesion to electrodes, and improved insulation characteristics, air permeability and battery lifetime characteristics.

As used herein, the terms "use", "using", and "used" may be considered synonymous with the terms "utilize", "utilizing", and "utilized", respectively. Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that the embodiments described herein should be considered in a descriptive sense only and not for purposes of limitation. Descriptions of features or aspects within each embodiment should typically be considered as being available for other similar features or aspects in other embodiments.

While one or more embodiments have been described with reference to the drawings, it will be understood by those of ordinary skill in the art that various changes in form and details may be made therein without departing from the spirit and scope of the present disclosure, as defined by the following claims and equivalents thereof.

What is claimed is:

1. A separator comprising a substrate and a coating layer on at least one surface of the substrate,
    wherein the coating layer is an organic layer and comprises first organic particles and second organic particles,
    wherein an average particle diameter of the first organic particles is larger than an average particle diameter of the second organic particles, and
    wherein the first organic particles protrude a height of about 0.1 µm to about 0.5 µm from a dented portion of a surface of the coating layer, the dented portion being between the protruded first organic particles, and wherein the first organic particles are distributed on the surface of the coating layer in an area ratio of about 5% or greater to less than 30% with respect to a total surface area of the coating layer.

2. The separator of claim 1, wherein the first organic particles have an average particle diameter of about 0.3 μm to about 0.7 μm.

3. The separator of claim 1, wherein the first organic particles have a glass transition temperature ($T_g$) of about 40° C. to about 70° C.

4. The separator of claim 1, wherein the first organic particles comprise at least one selected from the group consisting of polystyrene, polyvinylidene fluoride, polymethyl methacrylate, polyacrylonitrile, polyvinylidene, polyvinyl acetate, polyethylene oxide, cellulose acetate, and azodicarbonamide.

5. The separator of claim 1, wherein the second organic particles have an average particle diameter of about 0.15 μm to about 0.35 μm.

6. The separator of claim 1, wherein the second organic particles comprise an iron (Fe) content of about 0.01 ppm to about 1 ppm.

7. The separator of claim 1, wherein a thermal decomposition temperature of the second organic particles is about 200° C. or greater.

8. The separator of claim 1, wherein the second organic particles comprise cross-linked polystyrene and/or cross-linked polymethylmethacrylate.

9. The separator of claim 1, wherein the first organic particles and/or the second organic particles have a core-shell structure.

10. The separator of claim 1, wherein a weight ratio of the first organic particles to the second organic particles in the coating layer is about 50:50 to about 10:90.

11. The separator of claim 1, wherein the coating layer has a thickness of about 0.3 μm to about 3.0 μm.

12. The separator of claim 1, wherein the coating layer further comprises cellulose nanofibers.

13. The separator of claim 1, wherein the coating layer further comprises third organic particles having a melting point ($T_m$) of about 100° C. to about 130° C.

14. The separator of claim 13, wherein the third organic particles have an average particle diameter of about 0.1 μm to about 1.0 μm.

15. The separator of claim 13, wherein the third organic particles comprise polyethylene wax.

16. The separator of claim 1, wherein the coating layer further comprises a water-dispersible binder.

17. A method of preparing the separator according to claim 1, the method comprising:

preparing a slurry comprising the first organic particles and the second organic particles;

coating the slurry on the at least one surface of the substrate; and drying the coated slurry.

18. A lithium battery comprising:

a positive electrode;

a negative electrode; and the separator according to claim 1 interposed between the positive electrode and the negative electrode.

19. The lithium battery of claim 18, wherein the separator comprising the coating layer has an increase in air permeability of about 15 sec/100 mL to about 50 sec/100 mL with respect to the substrate as an uncoated reference, a breakdown voltage (BDV) of about 0.5 kV to about 3.0 kV, a BDV increase of about 0.1 kV or greater with respect to the substrate as the uncoated reference, a water content of about 400 ppm or less, and a bending strength of about 100 N to about 700 N.

* * * * *